(12) United States Patent
Lakshman et al.

(10) Patent No.: US 6,341,130 B1
(45) Date of Patent: Jan. 22, 2002

(54) PACKET CLASSIFICATION METHOD AND APPARATUS EMPLOYING TWO FIELDS

(75) Inventors: Tirunell V. Lakshman, Morganville; Dimitrios Stiliadis, Matawan, both of NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/146,122

(22) Filed: Sep. 2, 1998

Related U.S. Application Data

(60) Provisional application No. 60/073,996, filed on Feb. 9, 1998.

(51) Int. Cl.[7] .............................................. H04L 12/66
(52) U.S. Cl. ...................... 370/389; 370/351; 370/392; 370/401; 709/238; 709/245
(58) Field of Search ................................. 370/389, 390, 370/400, 401, 402, 403, 404, 405, 406, 407, 408, 410, 466, 467, 351, 428, 392; 709/238, 230, 246, 249, 235, 245

(56) References Cited

U.S. PATENT DOCUMENTS

| | | | | |
|---|---|---|---|---|
| 5,781,772 A | * | 7/1998 | Wilkinson, III et al. | 370/401 |
| 5,951,651 A | * | 9/1999 | Lakshman et al. | 370/389 |
| 5,995,971 A | * | 11/1999 | Douceur et al. | 370/408 |
| 6,147,976 A | * | 11/2000 | Shand et al. | 370/392 |

OTHER PUBLICATIONS

Bailey et al., PATHFINDER: A Pattern–Based Packet Classifier, University of Arizona, pp. 1–9, 1994.*
McCanne et al, The BSD Packet Filter: A New Architecture for User–level Packet Capture, Lawrence Berkley Laboratory, pp. 1–11, 1992.*
Miei et al., Parallelization of IP–Packet Filter Rules, Nippon Telegraph and Telephone Co., pp. 381–388, 1997.*
DeBerg et al., Two–and Three–Dimensional Point Location in Rectangular Subdivision, University of British Columbia, pp. 1–17, 1995.*
Alessandri, Access Control List Processing In Hardware, Diploma Thesis, ETH, pp. 1–85, 1997.*

* cited by examiner

Primary Examiner—Wellington Chin
Assistant Examiner—Frank Duong
(74) Attorney, Agent, or Firm—Steve Mendelsohn; Ian M. Hughes

(57) ABSTRACT

A packet filter for a router performs generalized packet filtering allowing range matches in two dimensions, where ranges in one dimension at least one dimension is defined as a power of two. To associate a filter rule with a received packet EP, the packet filter employs a 2-dimensional interval search and memory look-up with the filter-rule table. Values of $s_m$ of filter-rule $r_m=(s_m,d_m)$ in one dimension are desirably ranges that are a power of two, such as prefix ranges, which are represented by a binary value having a "length" defined as the number of bits to of the prefix. The $d_m$ may be single points, ranges defined as prefix ranges, and/or ranges defined as continuous ranges. The packet filter employs preprocessing of the filter-rules based on prefix length as a power of 2 in one dimension and decomposition of overlapping segments into non-overlapping intervals in the other dimension to form the filter-rule table. A preprocessing algorithm searches in one dimension through filter rules and arranges the corresponding filter-rule rectangle segments according to prefix length. Then, in the other dimension, the overlapping filter rectangle segments are decomposed into non-overlapping intervals, and the highest priority filter-rule overlapping each non-overlapping interval is associated with that interval. A filter-rule table is then constructed with entries ordered according to prefix length and non-overlapping interval, each entry associated with a particular filter-rule. A packet classification algorithm then matches the field or other parameter information in the packet to the filter-rule table entries to identify the filter-rule rectangle associated with the filter-rule to be applied to the packet.

30 Claims, 9 Drawing Sheets

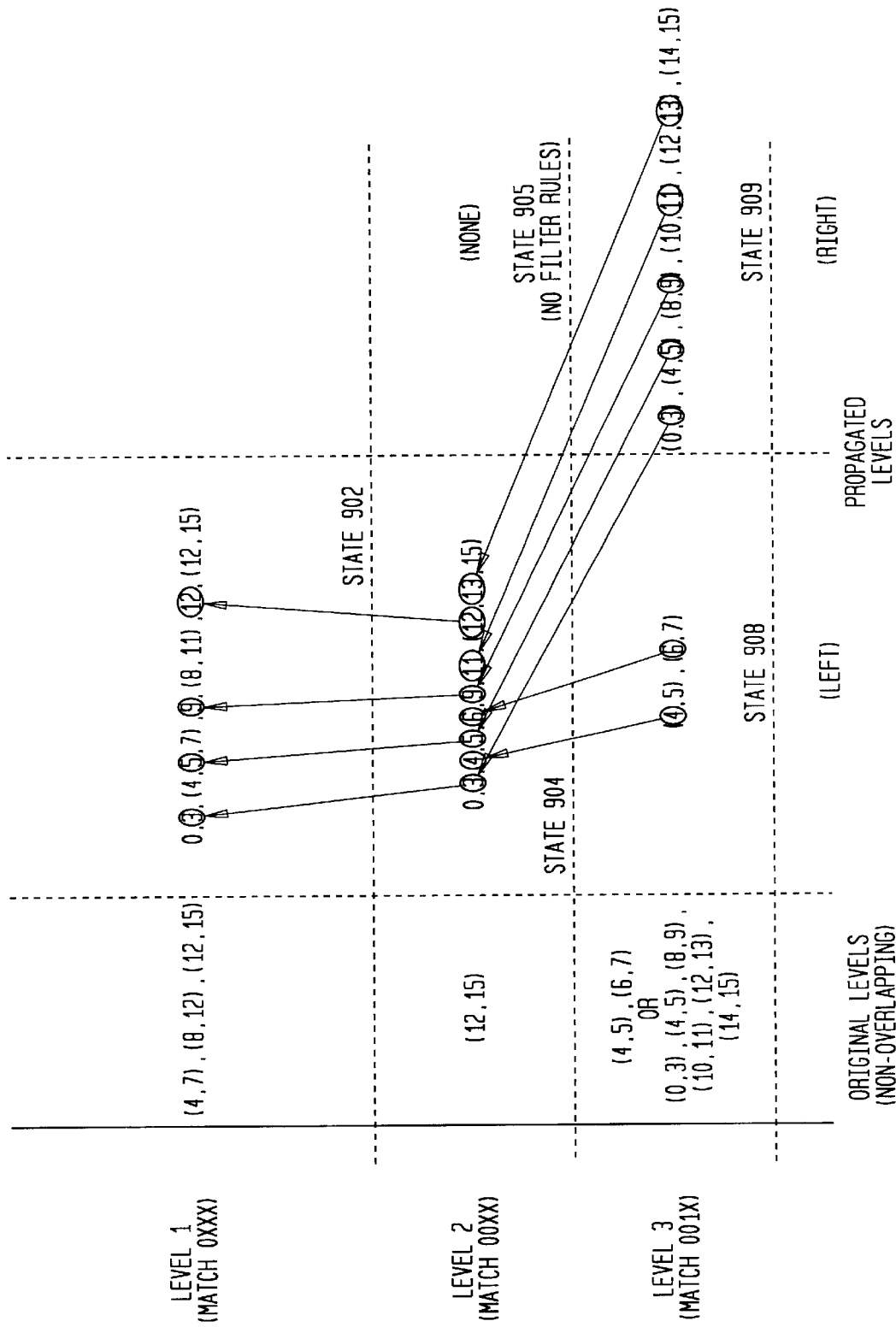

PACKET CLASSIFICATION METHOD AND APPARATUS EMPLOYING TWO FIELDS

CROSS-REFERENCE TO RELATED APPLICATIONS

This application claims the benefit of the filing date of U.S. provisional application No. 60/073,996, filed on Feb. 9, 1998.

BACKGROUND OF THE INVENTION

1. Field of the Invention

The present invention relates generally to packet forwarding engines used in telecommunications, and, in particular, to router algorithms and architectures for supporting packet filter operations using two packet fields.

2. Description of the Related Art

Packet-based communication networks, such as the Internet, typically employ a known protocol over paths or links through the network. Commonly known protocols are, for example, Transmission Control Protocol/Internet Protocol (TCP/IP) or Reservation Set-up Protocol (RSVP). Routers provided in a communication network provide a packet forwarding function whereby input data, usually in the form of one or more data packets, is switched or routed to a further destination along a network link. FIG. 1 shows a typical form of a data packet 20, which may be of variable length. Data packet 20 comprises, for example, a header 125 and payload data 150. Header 125 contains fields or parameters, such as a source address 130 where the data originates and at least one destination address 135 where the data is to be routed. Another parameter in the header 125 may be a protocol type 140 identifying a particular protocol employed in the communication network.

FIG. 2 shows a router 245 of a network node receiving streams or flows of data packets from input links 247 and routing these packet streams or flows to output links 260. To perform a forwarding function, router 245 receives a data packet at an input link 247 and a control mechanism 250 within the router utilizes an independently generated look-up table (not shown) to determine to which output link 260 the packet should be routed. It is understood that the packet may first be queued in buffers 252 before being routed, and that the forwarding function is desirably performed at a high rate for high forwarding throughput.

Source and destination addresses may be logical addresses of end hosts (not shown). Thus, data packet 20 of FIG. 1 may further comprise unique source port numbers 137 and destination port numbers 139. Header 125 may also include, for example, certain types of flags (not shown) in accordance with protocol type 140, such as TCP, depending upon the receiver or transmitter application.

Network service providers, while using a shared backbone infrastructure, may provide different services to different customers based on different requirements. Such requirements may be different service pricing, security, or Quality of Service (QoS). To provide these differentiated services, routers typically include a mechanism for 1) classifying and isolating traffic, or packet flows, from different customers, 2) preventing unauthorized users from accessing specific parts of the network, and 3) providing customized performance and bandwidth in accordance with customer expectations and pricing.

Consequently, in addition to the packet forwarding function, router 245 of FIG. 2 may perform a packet filtering function. Packet filtering may be employed, for example, as "firewall protection" to prevent data or other information from being routed to certain specified destinations within the network. To perform packet filtering, the router 245 may be provided with a table or list of filter rules specifying that routing of packets sent from one or more of specified sources is denied or that specific action is to be taken for that packet having a specified source address. Such packet filtering may be employed by layer four switching applications.

Specifically, packet filtering parses fields from the packet header 125 including, for example, both the source and destination addresses. Parsing allows each incoming packet to be classified using filter rules defined by network management software, routing protocols, or real-time reservation protocols such as RSVP.

Filter rules may also specify, for example, that received packets with fields specifying that a particular destination address should or should not be forwarded through specific output links, or that some other specific action should be taken before routing such received packets. Thus, a variety of filter rules may be implemented based on packet field information. For example, such filter rules might be based on 1) source addresses; 2) destination addresses; 3) source ports; 4) destination ports; and/or 5) any combination of these fields.

Packet filtering of the prior art generally requires either an exact match operation of the fields or a match operation defined in terms of field ranges for a filter rule. Field ranges may specify, for example, ranges of source addresses, destination addresses, source/destination port numbers, and/or protocol types. Filter rules are then applied to every packet that the router receives; that is, for each packet received by the router, every filter rule is successively applied to each packet to ascertain whether that packet is to be forwarded, restricted, or re-routed according to the filter rule. However, implementation of a large number of filter rules in a router (e.g. 500 or more) is time consuming with respect to processor execution time since all filter rules must be tested. Hence, routers implementing filters having a large number of filter rules have decreased throughput, compromising a quality of service (QoS). Thus, for a router such as router 245 to maintain a relatively high level of throughput, the filtering function must be performed at very high rate.

The IP packet header fields may contain up to 128 bits of parameter information, including source and destination addresses, physical source and destination port numbers, interface number, protocol type, etc. Each of the fields or parameters in the header may be represented as being along an axis of a dimension. The general packet classification problem of a packet filter may then be modeled as a point-location in a multi-dimensional space. One or more field values of a packet define a point in the multi-dimensional space. A packet filter rule associated with a range of values of each defines an object in the multi-dimensional space.

A point-location algorithm in a multi-dimensional space with multi-dimensional objects finds the object that a particular point belongs to. In other words, given a received point $EP=\{E_1, E_2, \ldots E_D\}$ in a space having D dimensions, find one or more of a set of n D-dimensional objects including the point (n being an integer greater then 0). The general case of D>3 dimensions may be considered for the problem of packet classification. As is known in the art, the best algorithms optimized with respect to time or space have either an $O(\log^{D-1} n)$ time complexity with $O(n)$ space or an $O(\log n)$ time complexity with $O(n^D)$ space, where $O(\cdot)$ mathematically represents "on the order of." Comparing algorithms on the basis of the order of operations is particularly useful since operations may be related to memory requirements (space) and execution time (time complexity).

Though algorithms with these complexity bounds are useful in many applications, they are not currently useful for packet filtering. First, packet filtering must complete within a specified amount of time, which generally forces a value for n to be relatively small relative to asymptotic bounds, but routers typically filter packets with a number of filter rules in the range of a few thousand to tens of thousands. Consequently, even point-location algorithms with poly-logarithmic time bounds are not practical for use in a high-speed router.

For example, router 245 desirably processes n=1K filter rules of D=5 dimensions within 1 $\mu$s to sustain a 1 million-packets-per-second throughput. However, an algorithm employed with O($\log^{D-1} n$) complexity and O(n) space has a $\log^4 1024$ execution time and O(1024) space, which requires 10K memory accesses (look-ups) per packet. If an O($\log n$) time O($n^4$) space algorithm is employed, then the space requirement becomes prohibitively large (greater than 1000 Gigabytes).

For the special case of two dimensions, the filter rules defined for field ranges are modeled as objects in two dimensions, for example, forming rectangles in the 2-dimensional space. For a 2-dimensional space having non-overlapping rectangles, some packet filter algorithms have logarithmic complexity and near-linear space complexity. However, these algorithms do not consider the special problem related to arbitrary overlapping rectangles in the multi-dimensional space requiring a decision of which overlapping filter rules to apply to a packet. The problem may be resolved through a priority of the longest field prefix. An algorithm of the prior art where the time complexity is O($\log(\log N)$) is based on stratified tree searches in a finite space of discrete values. Examples of these algorithms are discussed in, for example, M. De Berg, M. van Kreveld, and J. Snoeyink, Two- and Three-dimensional Point Location in Rectangular Subdivisions, Journal of Algorithms, 18:256–277, 1995. Data structures employed by this prior art algorithm require a perfect hashing operation in every level of the tree. The pre-processing complexity, without using a randomized algorithm, of calculating the perfect hash is O($\min(hV, n^3)$), where h is the number of hash functions that must be calculated and V is the size of the space. Consequently, for a 2-dimensional space, longest-prefix lookups may result in executions requiring $2^{32}$ cycles, even for a relatively small number of filter rules, even if pre-processing is only required once every several seconds.

SUMMARY OF THE INVENTION

The present invention relates to a packet filter associating at least one filter rule with a packet, each filter rule and the packet characterized by values in first and second dimensions, the filter rule to be applied to the packet by a router in a communications network. In accordance with an exemplary embodiment, a filter-rule table is provided with each entry of the filter-rule table corresponding to a prefix value having a length in the first dimension and at least one interval in the second dimension. Each prefix value matching the value of the packet in the first dimension is identified, and each interval corresponding to identified prefix values containing the value of the packet in the second dimension is retrieved. A solution interval is determined as the interval associated with the prefix value associated with a predetermined metric and containing the value of the packet in the second dimension; and the filter rule corresponding to the solution interval is associated with the packet.

In accordance with another exemplary embodiment, the filter-rule table is created by first assigning each filter-rule to one or more prefix values based on the values in the first dimension; and then projecting, for each prefix value having the same length, values of each corresponding filter rule of the prefix value onto the second dimension to define at least one filter-rule segment. Each filter-rule segment is decomposed into one or more non-overlapping intervals associated with each prefix value having the same length and corresponding filter rule in the second dimension; and a pointer is generated for each non-overlapping interval identifying each filter rule contained in the non-overlapping interval. The pointer is stored as an entry of the filter-rule table associated with a prefix value length and a non-overlapping interval.

BRIEF DESCRIPTION OF THE DRAWINGS

Other aspects, features, and advantages of the present invention will become more fully apparent from the following detailed description, the appended claims, and the accompanying drawings in which:

FIG. 9B illustrates an example of point propagation of an exemplary embodiment employing virtual intervals to reduce search time of a classification algorithm;

DETAILED DESCRIPTION

Figure 1:
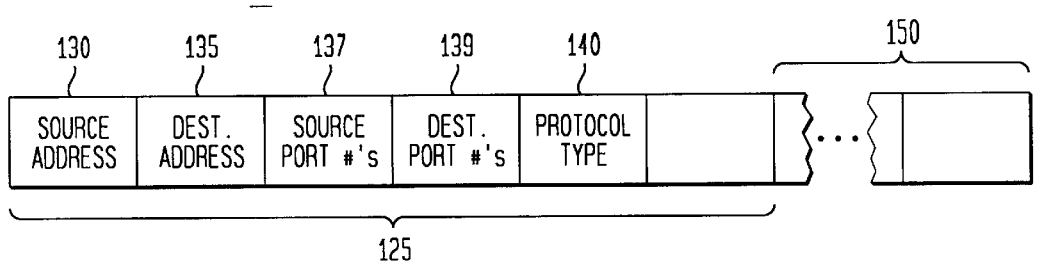
FIG. 1 shows a typical form of a data packet of a communications network.
Figure 2:
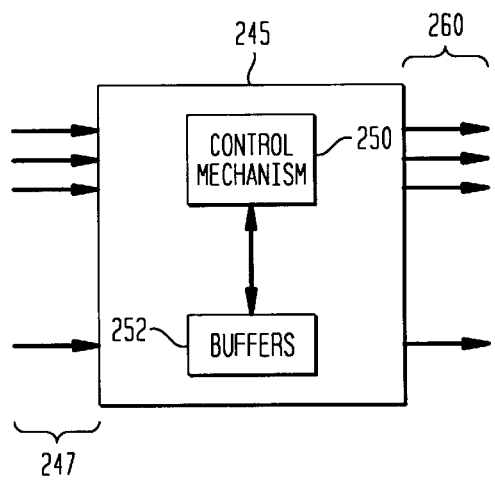
FIG. 2 shows a router of a network node receiving and forwarding packet streams.

For exemplary embodiments of the present invention, a packet filter associates a 2-dimensional filter rule with an arriving packet EP having fields S and D. For a unicast forwarding packet filter, these values S and D may be source and destination address values, respectively, of the packet. For a multicast forwarding packet filter, the value S may be the source address value of a packet and D a group identifier (ID) that identifies the multicast group that the packet may be forwarded to. The value for S may be contained in a range of binary values s, s being associated with an axis in one dimension (the s-dimension). Similarly, the value for D may be contained in a range of binary values d, d being associated with another axis in another dimension (the d-dimension). The packet filter includes a set of n packet-filtering rules RP having 2 dimensional filter rules $r_1$ through $r_n$ to be associated with the packet. Each filter rule $r_m$, m an integer greater than 0, may be denoted as $r_m = \{s_m, d_m\}$, which is a set of two field ranges $s_m$ and $d_m$ in the s-dimension and d-dimension that define the filter rule $r_m$ in the 2-dimensional space.

To associate a filter rule with a received packet EP, the packet filter employs a 2-dimensional interval search and memory look-up with the filter-rule table. Locating a pair of values S and D for fields of a packet EP and associating a 2-dimensional filter rule with the packet may be modeled as a point-location problem in a 2-dimensional space. The packet EP having field values S and D arrives at the router and is defined as a query point (S, D) of a 2-dimensional space. For the point-location problem where packet filtering involves orthogonal rectangular ranges, a search in 2-dimensions of a 2-dimensional, orthogonal, rectangular range decomposes each rectangle into a set of 1-dimensional filter-rule intervals to allow 1-dimensional searches over 1-dimensional intervals.

For a simple embodiment, preprocessing of filter-rules may construct the filter-rule table as a 2-dimensional look-up table comprising filter-rule pairs $(s_m, d_m)$, m an integer greater than 0, where each $s_m$ is a prefix of possible source addresses and each $d_m$ is a contiguous range, or a single point, of possible destination addresses or group IDs. For the table, each pair $(s_m, d_m)$ defines a filter-rule rectangle $r_m = \{s_m, d_m\}$ for the n packet-filtering rules $r_1$ through $r_n$ in 2-dimensions, and rectangles may overlap. The point location in a 2-dimensional space operates as follows: given the query point (S, D) of packet EP, the search or look-up algorithm for packet classification finds an enclosing filter-rule rectangle $r_m = (s_m, d_m)$, if any, such that the query point (S, D) is contained in $r_m$, and such that $s_m$ is the most specific filter according to a predefined metric, such as, for example, the longest matching prefix of field value S or the highest priority rule for a given prefix length.

For Internet Protocol (IP) routers employing an algorithm in accordance with the present invention, look-up tables may have as many as $2^{16}$ entries or more. Also, algorithms employed may generally be evaluated based on worst-case performance since queuing for header processing is desirably avoided to provide a specific Quality of Service (QoS). For the exemplary filter-rule table, a value n may be defined to denote a number of entries in the table, for example a multicast forwarding table, corresponding to the n filter rules $r_1$ through $r_n$. An n×n array may be formed in a memory with each entry representing the highest-priority filter-rule rectangle of the n filter rules $r_1$ through $r_n$ enclosing a point corresponding to the coordinates represented by the entry. An exemplary classification (i.e., look-up) algorithm that employs this simple table may employ two binary searches, one for each of the dimension. This exemplary classification algorithm may require O(log n) time and $O(n^2)$ memory space. The $O(n^2)$ memory space is due to one rectangle being represented in O(n) locations. Such simple table might not be preferred, however, for a high-speed router when the number of filtering rules is $n = 2^{16}$ or greater since the required memory space or memory access time may be excessive.

Consequently, preferred embodiments of the present invention employ preprocessing of the filter-rules based on prefix length as a power of 2 in one dimension and decomposition of overlapping segments into non-overlapping intervals in the other dimension to form the filter-rule table. A packet filter of the present invention first searches in one dimension through filter rules and arranges the corresponding filter-rule rectangle segments according to prefix length. Then, in the other dimension, the overlapping filter rectangle segments are decomposed into non-overlapping intervals, and the highest priority filter-rule overlapping each non-overlapping interval is associated with that interval. A filter-rule table is then constructed with entries ordered according to prefix length and non-overlapping interval, each entry associated with a particular filter-rule. This filter-rule table is constructed within a router prior to processing of received packets. Packet classification in accordance with the present invention then processes the received packets using the field or other parameter information in the packet. The field or other parameter information is matched to the filter-rule table entries to identify the filter-rule rectangle associated with the filter-rule to be applied to the packet.

In accordance with the present invention, values for each $s_m$ of $r_m = (s_m, d_m)$ in the s-dimension are desirably ranges that are a power of two. Consequently, prefix values ("prefixes") define ranges ("prefix ranges") that are a power of two. The length of a prefix is the number of specified bits of the prefix. The prefix range is between a lower bound defined by the prefix and unspecified bits set to logic "0" and the upper bound defined by the prefix and unspecified bits set to logic "1". The length may be represented by a binary value. The $d_m$ may be single points, ranges defined in a manner similar to prefix ranges in the s-dimension, and/or ranges defined as continuous ranges. When multiple matches of a same length prefix occur for a specific value of $s_m$, the query point (S, D) is associated with the highest priority filter rule having the matching prefix of $d_m$, if an overlap also occurs in the d-dimension.

Figure 3:
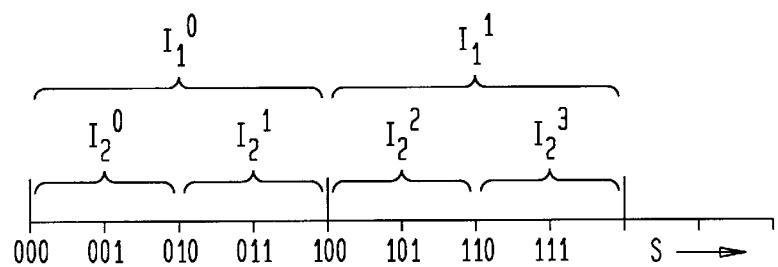
FIG. 3 illustratively depicts prefix ranges of a field in an s-dimension where the prefix ranges are a power of two.

FIG. 3 illustratively depicts prefixes and prefix ranges of a field in a s-dimension where the prefix ranges are a power of two. Field values s, which may be source addresses, vary from 000 to 111 (binary). An address may be a point (i.e., 010) or within a range (i.e., 010 to 101). For a special case, prefix ranges may be a power of 2. For example, if a prefix range is defined as 0xx, the prefix, represented as a single value 0, specifies the range 000 to 011. For this example, the prefix has a length of 1 corresponding to one specified bit. Two prefixes of length 1 are possible: $I_1^0$ and $I_1^1$. If the prefix has two bits, or a length of 2, then four prefixes are possible: $I_2^0$, $I_2^1$, $I_2^2$, and $I_2^3$. Prefixes of different length define prefix ranges that are different powers of two. The prefix ranges do not overlap.

Figure 4:
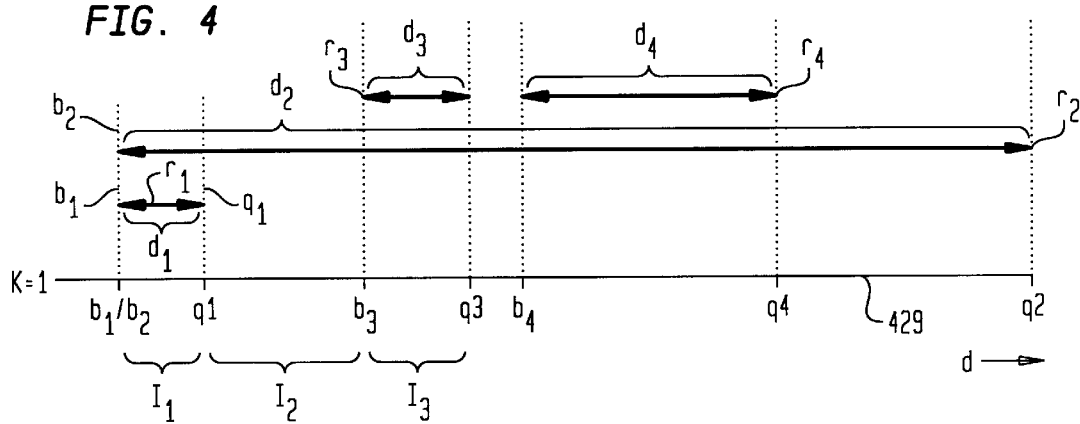
FIG. 4 illustratively depicts segments of a filter rule having one or more field ranges of destination addresses projected as horizontal intervals.

FIG. 4 illustrates an example of decomposition in the d-dimension of a 2-dimensional filter-rule rectangle into 1-dimensional overlapping segment sets and then into non-overlapping intervals. As described previously, values for each $d_m$ of filter rule $r_m = (s_m, d_m)$ in the d-dimension may be any contiguous range and are not necessarily restricted to prefix ranges only. FIG. 4 shows a horizontal axis 429 for the d-dimension representing, for example, parameter values for IP destination addresses. The process searches through each of the applicable filter rules $r_1, \ldots r_4$ to be implemented in the router for each dimension, and the process may be implemented before processing of arriving packets. Each of the filter rules $r_1, \ldots r_4$ specifies field ranges such as $d_1, \ldots d_4$ for the d-dimension applicable to the particular parameter of the packet header.

Field ranges $d_1, \ldots d_4$ are projected as overlapping horizontal line segments, with each segment specifying a start point "$b_i$" and end point "$q_i$" of a range for a particular corresponding filter rule (i an integer greater than 0). For example, $d_1$ specifies a first range of source addresses on a first segment defined by start point "$b_1$" and end point "$q_1$" for filter rule $r_1$. Segments may overlap, such as those of $d_1$ and $d_2$. Consequently, segments are decomposed into non-overlapping intervals $I_j$ (j an integer greater than 0). Therefore, the segment defined by start point "$b_1$" and end point "$q_1$" for filter rule $r_1$ has a single associated interval $I_1$, but the segment defined by start point "$b_2$" and end point "$q_2$" for filter rule $r_2$ has three intervals $I_1$, $I_2$, and $I_3$ associated with filter rule $r_2$. These three non-overlapping intervals $I_1$, $I_2$, and $I_3$ are a result of decomposing the overlapped segments of filter rules $r_1$, $r_2$, and $r_3$ at start or end points. It should be understood that for each filter rule, a range of source addresses and a range of destination addresses, for example, may be specified.

As described previously, values in the s-dimension of each rectangle desirably have lengths of a power of 2 when the values in the s-dimension are defined as prefix ranges. Ranges in dimensions being prefix ranges provide constraints such as illustrated in FIG. 3. When prefix range intervals have lengths which are powers of two, arbitrary overlapping of filter-rules for the dimension does not occur since two prefixes of the same length do not overlap. Also, a prefix range interval starts from an even-value point and terminates at an odd-value point. Consequently, a set of prefix ranges form several distinct cells distinguished by the length of the prefix or, equivalently, the length of the range. Further, values for each $d_m$ of filter rule $r_m=(s_m,d_m)$ in the d-dimension may be any contiguous range, such as illustrated in FIG. 4, and are not necessarily restricted to prefix ranges unless the value for $d_m$ is defined as a prefix range. However, modifying the packet filter in accordance with the present invention to define values for $d_m$ as prefix ranges may be desirable, such as if destination addresses are concatenated with layer-4 destination ports or some other similar header field.

In accordance with the present invention, filter-rule table cells for prefix ranges and associated non-overlapping intervals are defined containing pointers to filter-rules as entries in the filter-rule table in the following manner. Given each rule $r_i=(s_i,d_i)$, for the field range $s_i$ that is an integer power of 2, the length is defined as $l_{si}$ bits and for the field range $d_i$ the length is defined as $l_{di}$ bits. The maximum values of lengths $l_{si}$ and $l_{di}$ are defined as $l_{sMAX}$ and $l_{dMAX}$, respectively. The set of prefixes having a length of i bits are denoted as $P_i$, $i<0 \leq l_{sMAX}$. As described with respect to FIG. 3, there may be several different prefixes of a given length i, i.e. the set of prefixes of length $l$ ($P_1$) may have up to two elements, prefixes starting with "0" and prefixes starting with "1". The value $np_i$ denotes the number of elements in the set of prefixes of length i ($P_i$) that are present in the lookup table. The elements of the set of prefixes of length i ($P_i$) may be numbered in ascending order of their values; consequently, the $np_i$ prefixes of the set $P_i$ are defined as the set $\{P_i^1, P_i^2, \ldots, P_i^{npi}\}$.

The set of filter-rule rectangles $RP=\{RP_1, RP_2, \ldots, RP_{lsMAX}\}$ is defined such that each $RP_i$ is a subset of the set of n filter rule rectangles RP such that subset $RP_i$ includes all filter-rule rectangles formed from s value prefixes having a length of i bits. Further, each subset $RP_i$ may be defined as the union of the sets of filter-rule rectangles $RP_i^j=\{(P_i^j,d_i^1), (P_i^j,d_i^2), \ldots,\}$ where each filter-rule rectangle $RP_i^j$ has the $j^{th}$ prefix of length i ($P_i^j$) as a side of the filter-rule rectangle in the s-dimension. Therefore, each of the filter-rule rectangles in set $RP_i^j$ may associated with each prefix $P_i^j$ (j an integer and $1 \leq j \leq np_i$).

Each value $d_i^j$ in the d-dimension of the set of filter-rule rectangles $RP_i^j=\{(P_i,d_i^1), (P_i^j,d_i^2), \ldots,\}$ is a range in the d-dimension that may overlap other ranges. As defined, the subset of rectangles $RP_i$ is the union of sets $RP_i^1$, $RP_i^2$, $\ldots$, $RP_i^j \ldots, RP_i^{npi}$, (j an integer and $1 \leq j \leq np_i$), and each of the $RP_i^j$ are disjoint. Filter-rule rectangles in set $RP_i^j$ are formed with longer prefixes than those filter rectangles in set $RP_t^j$ if i>t. A filter-rule having a longer prefix value in the s-dimension may be defined to have higher priority than other filter-rules with shorter prefix length since they are more specific with respect to, for example, packet source address. Consequently, if filter-rule rectangles in $RP_i^j$ and $RP_t^j$ match a point EP=(S, D) based on field values in the s-dimension, then the filter-rule associated with $RP_i^j$ is applied to packet EP. The filter-rule associated with $RP_i^j$ is applied to packet EP since rectangles in $RP_i^j$ are formed with longer prefixes than those rectangles formed in $RP_t^j$.

For the d-dimension, the size of the list of the set of $d_i^j$ values may be defined as $k_i^j$, k an integer greater than 1. From each list of j ranges in a rule set $RP_i$ comprising ($s_i$, $d_i^j$), a list of non-overlapping intervals $ID_i^j$ is formed along the axis of the d-dimension from filter-rule segments $Id_i^j$ corresponding to the values of $d_i^j$. The size of this new set of intervals $ID_i^j$ may be $K_i^j \leq 2k_i^j+1$. By representing the original $k_i^j$ overlapping intervals as non-overlapping intervals, a memory space requirement of the packet filter may be increased by only a constant factor of 2.

For the d-dimension, if the values for $d_i^j$ are defined to be prefix ranges, then the projected filter-rule segments $Id_i^j$ along the d-dimension axis do not overlap, and so the $Id_i^j$ become the list of non-overlapping intervals $ID_i^j$.

For the general case, replacing overlapping intervals by non-overlapping intervals allows a search algorithm to locate the field value D from the query point (S, D) on one of these non-overlapping rectangles during the search procedure. The search algorithm then retrieves the associated enclosing rectangle of the non-overlapping rectangles representing the filter rule to be applied to the packet. Consequently, when many filter-rule rectangles overlap a given interval in the d-dimension, the particular filter-rule rectangle associated with the given interval when non-overlapping intervals are formed is the filter-rule rectangle with the highest priority that overlaps the interval.

Figure 5:
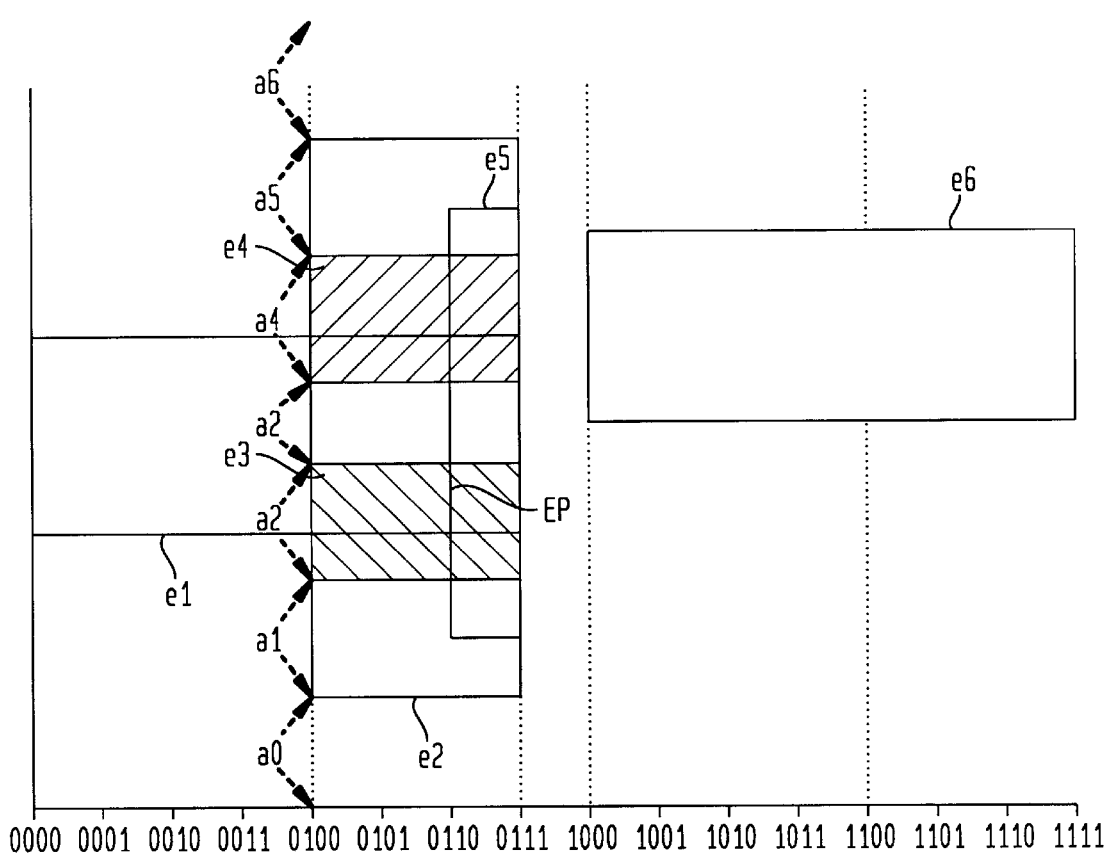
FIG. 5 illustrates a 2-dimensional space for an exemplary packet filter in accordance with the first embodiment of the present invention.

FIG. 5 illustrates a 2-dimensional space for an exemplary packet filter in accordance with the first embodiment. FIG. 5 shows a total of $np_1=2$ prefixes of length i equal to 1 (i.e. 0xxx and 1xxx). For the set of rectangles $RP_1$ with prefix length i equal to 1, the corresponding set of filter-rule rectangles is $RP_1=\{e1,.e6\}$. Also shown is a total of $np_2=1$ prefixes of length i equal to 2 (i.e., 01xx) for the set $RP_2$ of filter-rule rectangles formed with prefixes of length i equal to 2. The set $RP_2$ includes the filter-rule rectangles $\{e2, e3, e4\}$. These filter-rule rectangles may overlap on the axis of the d-dimension. Similarly, set of filter-rule rectangles $RP_3$ with prefix of length i equal to 3 (i.e., 011x) contains one filter-rule rectangle e5.

For the illustration shown in FIG. 5, the set of intervals given a prefix length of 2 that are created after this overlap elimination for each $Id_2^1$ is $ID_2^1=\{a_0, a_1, \ldots a_6\}$. Filter-rule rectangles e2 and e3 overlap in the d-dimension. Filter-rule rectangle e3 of the set of rectangles $RP_2^1$ is associated with interval $a_2$, since this filter-rule rectangle may be defined to have the higher priority than filter rule rectangle e2.

Consequently, only this filter-rule rectangle e3 is associated with interval $a_2$ even though another filter-rule rectangle with lower priority overlaps this range $a_2$.

For the exemplary system of FIG. 5, a packet EP with header field values (S=0110, D=0101) arrives. First, a matching prefix of length 1 from S=(0) is found and a search performed for enclosing rectangles formed with this prefix. The d-dimension is searched and filter-rule rectangle e1 shown in FIG. 4 is a first candidate rule, or is the current solution. Note that rectangles e1 and e6 of FIG. 5 are the only rectangles in the set of rectangles with prefixes of length equal to 1. Next, a search for the matching prefix (01) is performed over the prefixes of length 2. Rectangle e3 is determined to be a better candidate rule since 1) the D value of the arriving packet overlaps with the range a2, 2) this filter-rule rectangle e3 is formed with a longer prefix than rule e1, and 3) this filter-rule rectangle has higher priority than other rectangles formed with prefixes of equal or lower length. Finally, a matching prefix (001) of length 3 is located and a search among rectangles with this prefix is performed, resulting in the rule of rectangle e5 as the best solution.

A packet filter of the present invention for a router employs an algorithm having two parts. The first part is a pre-processing algorithm that searches through filter rules and decomposes the filter rules for each dimension. The first part is performed by the router prior to processing of received packets. A second part is a classification algorithm that processes the received packets using the field or other parameter information in accordance with the processed filter rules of the pre-processing algorithm.

Figure 6:
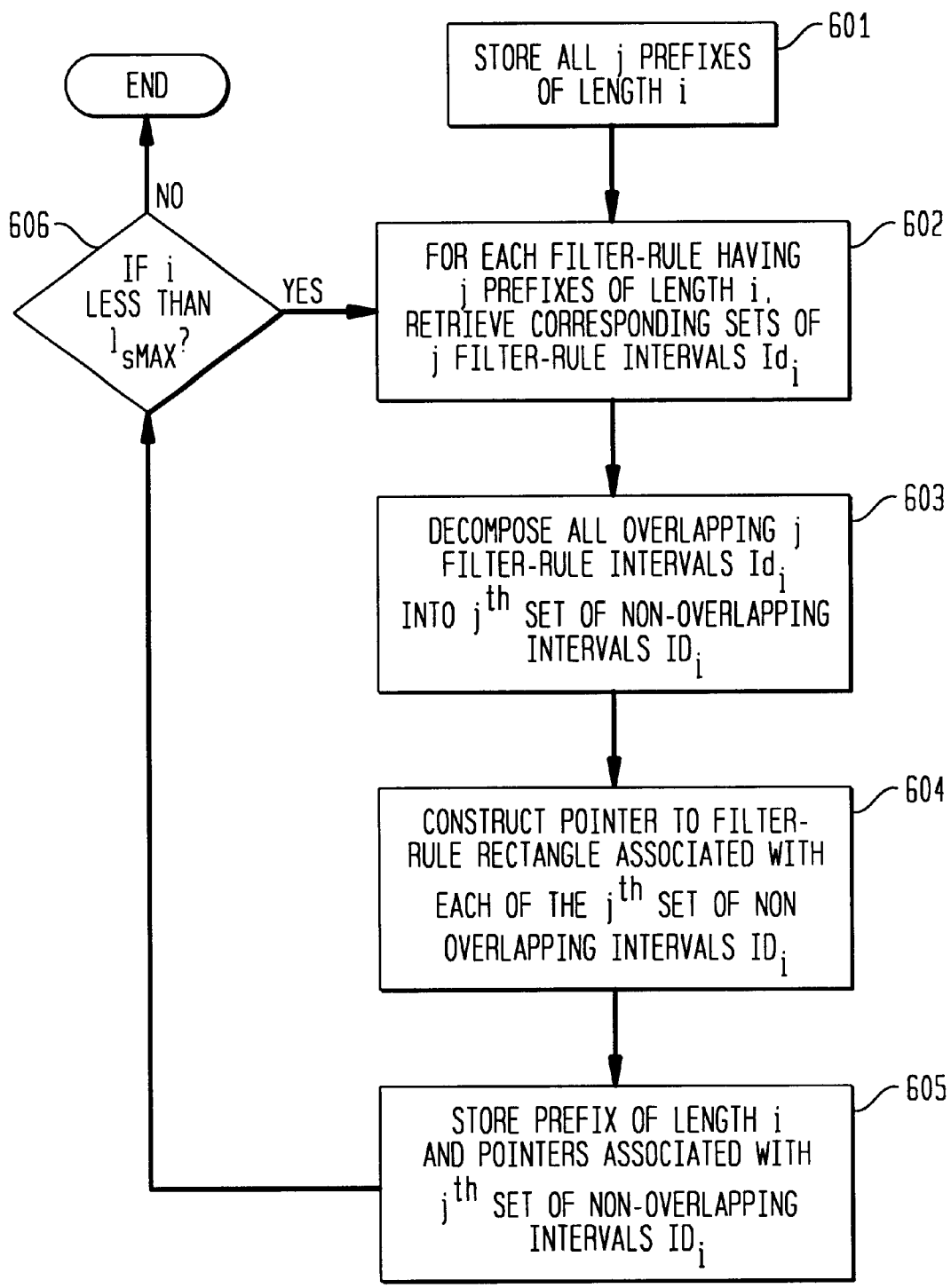
FIG. 6 illustrate steps of an exemplary pre-processing algorithm in accordance with the present invention.
Figure 7:
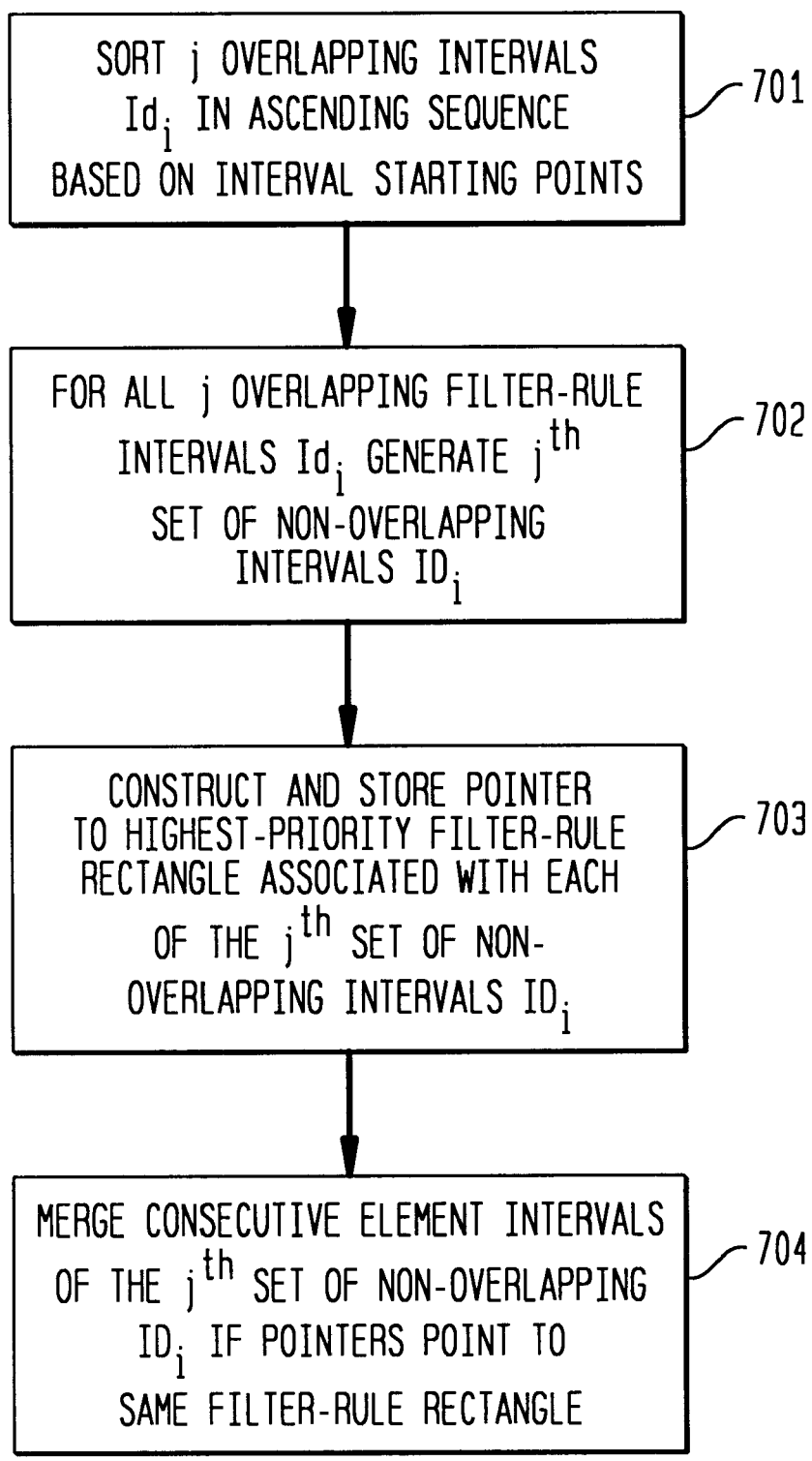
FIG. 7 illustrate steps of decomposing overlapping intervals into non-overlapping intervals as shown in FIG. 6.

An exemplary pre-processing algorithm for a packet filter in accordance with the present invention is shown and described with respect to FIG. 6 and FIG. 7. The pre-processing algorithm performs three operations to decompose the n filter-rule rectangles. First, the filter-rule rectangles are separated based on the prefix length in the s-dimension. Second, for each prefix of length i, all associated filter-rule rectangles are projected onto the corresponding axis in the d-dimension to obtain first the overlapping intervals $Id_i^j$. Third, a set of non-overlapping intervals $ID_i^j$ are created from these the overlapping intervals $Id_i^j$. The non-overlapping intervals may be created by a scan of the overlapping intervals from lower to higher coordinates in the d dimension.

FIG. 6 illustrates a flowchart of an exemplary pre-processing algorithm in accordance with the present invention. First, at step 601 the set of prefixes $P_i^j$ (as defined previously) for all i and j, $1 \leq i \leq 1_{sMAX}$ and $1 \leq j1 \leq np_i$, is stored in memory according to, for example, an efficient trie representation. Then, at step 602 for each filter-rule having prefix $P_i^j$, the corresponding set of filter-rule values $d_i^j$ in the d-dimension are projected as overlapping segments $Id_i^j$. At step 603, for all $P_i^j$, (i.e., for all j prefixes of length i, $1 \leq i \leq 1_{sMAX}$ and $1 \leq j1 \leq np_i$), the overlapping segments $Id_i^j$ are decomposed into a set of non-overlapping intervals $ID_i^j$. At step 604 a pointer is constructed to identify the highest priority filter-rule rectangle overlapping the associated non-overlapping interval for all intervals of the set $ID_i^j$. At step 605, the set of non-overlapping intervals $ID_i^j$ are stored with associated prefix $P_i^j$ as table entry in the filter-rule table. Each entry of the filter-rule table corresponds to the pointer identifying actions to applied to a packet for a corresponding filter rule. The list of non-overlapping intervals $ID_i^j$ may be stored in sorted sequence using either an array or a binary tree. At step 606, the algorithm returns to step 602 if $i<1_{sMAX}$, or until all prefix lengths $P_i$ are processed.

FIG. 7 is a flowchart illustrating the decomposition of intervals of the steps 603 and 604 of FIG. 6. For step 603 of FIG. 6, first, at step 701 the overlapping intervals $Id_i^j$ are sorted into an ascending sequence based on interval starting points. Then, at step 702, for all j, if an overlapping interval $Id_i^j$ starts or ends, an assigned, non-overlapping interval $ID_i^j$ is generated for previous interval. For step 604 of FIG. 6, at step 703, the assigned, non-overlapping intervals $ID_i^j$ and corresponding pointer to actions for the highest-priority filter-rule rectangle overlapping this interval are stored in memory. Optionally, at step 704 the newly created interval and the previously stored adjacent interval are compared, and are merged if the two intervals point to the same filter-rule. Since a new interval $ID_i^j$ is created, at most, when an overlapping interval begins or terminates, the size of this new set of intervals $ID_i^j$ is $K_i^j \leq 2k_i^j+1$ where $k_i^j$ is the size of the set of overlapping intervals $Id_i^j$.

In accordance with the pre-processing algorithm of the packet filter, each filter-rule is associated with a pointer in one or more filter-rule table entries. Each filter-rule pointer is stored in exactly one address in memory corresponding to prefix and prefix length on the s-dimension axis, and one or more addresses corresponding to non-overlapping intervals on the d-dimension axis. The set of filter-rule rectangles associated with a prefix is stored as a list of non-overlapping intervals and requires space only proportional to the size of the set. Only O(n) memory space may be utilized to store all the rectangles since each rectangle appears only in one set and therefore the size of the union of all sets is O(n).

Figure 8:
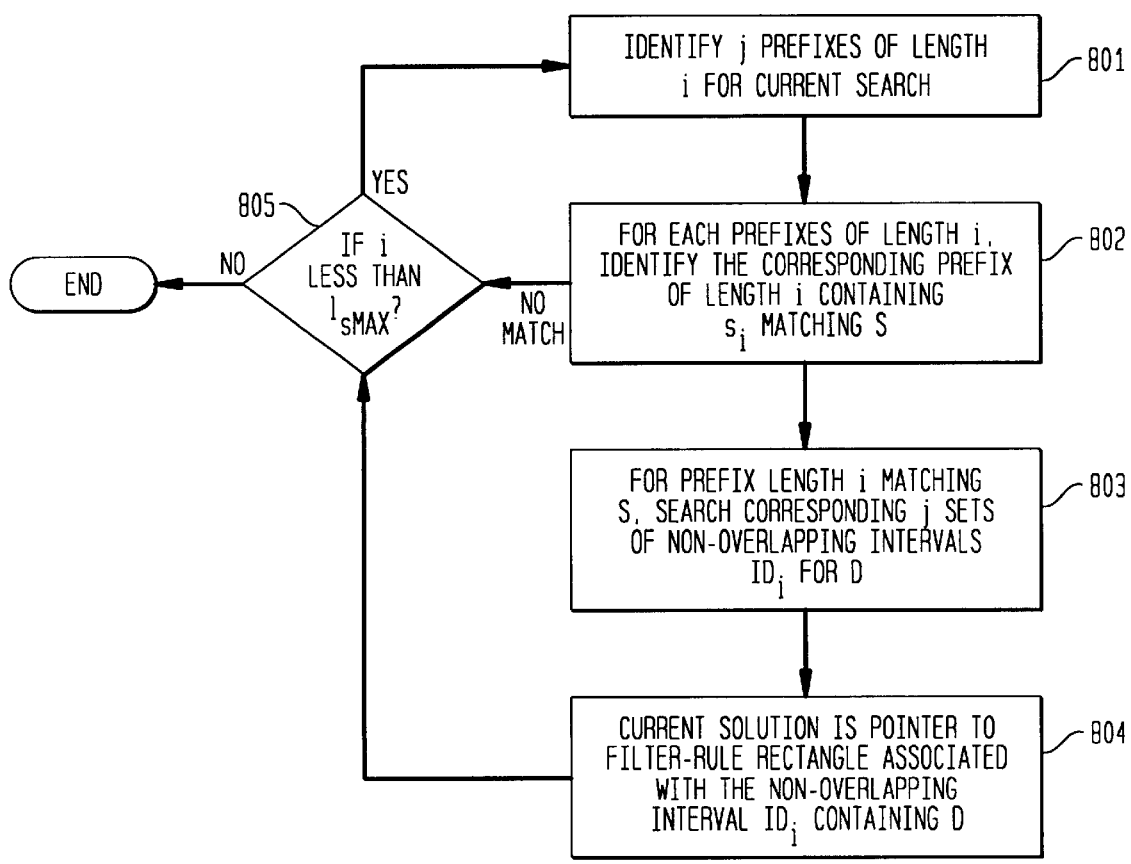
FIG. 8 illustrates steps of an exemplary classification algorithm in accordance with the present invention.

Once the preprocessing algorithm creates the filter-rule table, the classification algorithm performs a look-up search of the filter-rule table. FIG. 8 illustrates an exemplary flow-chart of the classification algorithm of the packet filter. The classification algorithm may begin at step 801. First, at step 801, prefixes of length i, $P_i = \{P_i^1, P_i^2, \ldots, P_i^{npi}\}$ are identified. Initially, the value of i may start from the shortest prefix length, such as i=1. Next, at step 802 the prefix $P_i^j$ of length i with an $s_i$ matching the query point S in the s-dimension is determined. If no match of S with $s_i$ in $P_i^j$ is found at step 802, then the algorithm moves to step 805. At step 805, the prefix length value i is incremented, until the longest prefix length is searched (i.e. increment i if $i<1_{sMAX}$). Consequently, the classification algorithm repeats for each prefix length until all prefix lengths have been searched.

If a match of S with an $s_i$ in $P_i^j$ is found at step 802, then at step 803 the stored structure in the d-dimension associated with $P_i^j$ is searched to find the non-overlapping interval $ID_i^m$ m that contains the query point D in the d-dimension. At step 804 the current solution is set as the pointer associated with table entry ($P_i^j, ID_i^m$) (m an integer greater than 0). The current solution may be the "best" solution among all prefix lengths searched so far if shorter prefix lengths correspond to lower priority rules, and the search begins at the shortest prefix (lowest priority) and goes to the longest prefix (highest priority). The algorithm then moves to step 805.

The number of iterations of the classification algorithm in the worst case is equal to the largest number of possible prefix lengths, which is $1_{sMAX}$. Consequently, the total time for searching through all prefix lengths is $O(1_{sMAX})$ times the time to search a list for a prefix length. In addition, the size of the lists of $ID_i^j$ for a prefix length may be O(n) since there are n filter-rules. Hence, an average O(log n) time is needed to search each list for a matching entry. The worst case total execution time of the exemplary classification algorithm is, therefore, $O(1_{sMAX}\log n)$.

However, for large numbers of table entries, worst case performance may not be sufficient for available processor speed. For example, if a number of possible prefix lengths $l_{sMAX}$ is 32 and the number of table entries n is $2^{18}$=256K. This exemplary classification algorithm may perform 576 memory accesses in the worst case, which may be prohibitively high. An alternative embodiment of the present invention employs a trie structure with virtual intervals for storage of data in memory to reduce the worst-case time-complexity $O(l_{sMAX}\log n)$ to a time-complexity $O(l_{sMAX})$.

A trie structure may be employed for data storage with a memory space requirement that may be O(n). Furthermore, the order of search for the sets of filter-rules $RP_1$, $RP_2$, . . . , may be organized by increasing order of prefix lengths. For example, a set of intervals from $RP_1$ is searched before searching a set of intervals from $RP_2$ and so on. The search proceeds in levels $L_i$, with a search of sets belonging to $RP_1$ being on the first level $L_1$, those in $RP_2$ being on the second level $L_2$ and so on. The number of non-overlapping intervals in all of $RP_i$ is defined as $N_i$. The root (i.e, bottom-most) level $R_{ie}$ has $N_{ie}$ non-overlapping intervals, and this level may be $RP_1$ with $N_1$ non-overlapping intervals. The number of overlapping intervals at each level without introducing virtual intervals may be O(n). In accordance with the present invention, introducing "virtual" intervals decreases search time of the classification algorithm in multiple ordered lists. If elements of a set of intervals are arranged by employing virtual intervals as described below, the worst case execution time may be $O(l_{sMAX}+\log n)$.

A search of the list of non-overlapping intervals at level $L_i$, for example, yields a result of the point D, where D is in an interval $ID_i^j$. A search of the lists at the next level $L_{i+1}$ is performed, instead of searching through the remaining intervals at level $L_i$. In general, the result of the previous search at level $L_i$ may be used for the search at level $L_{i+1}$, and the search at level $L_{i+1}$ is performed for only those intervals that fall in the range of intervals $ID_{i+1}^j$ in level $L_{i+1}$ given by the interval $ID_i^j$ at $L_i$. For this case, since each level at level $L_{i+1}$ there may be O(n/ls) intervals which fall within the range determined by $ID_i^j$. Hence, an $O(\log(n/ls))=O(\log n)$ search may be needed at every level.

Consequently, virtual intervals at levels $L_i \leq L_{lsMAX}$ are defined in the following manner. The number of intervals $N_i$ is defined at level $L_i$. Boundary points that demarcate the $N_i$ intervals in the d dimension at level $L_i$ are denoted by $y_1^i$, $y_2^i$ . . . with a maximum of $2N_i$ such points. Every other point at level $L_i$ is replicated at level $L_{i-1}$, and up to $2N_i$ points are so propagated to level $L_{i-1}$. Although the present embodiment is described using propagation of every other point, other embodiments may skip NS points, NS an integer greater than 1, or may vary the number of points skipped according to granularity of the pointers used.

The points that were propagated together with the points defining original non-overlapping intervals $ID_i^j$, now define intervals at level $L_{i-1}$ as new intervals $VD_{i-1}^j$. These intervals are stored as non-overlapping intervals at level $L_{i-1}$. Next, for all the intervals at level $L_{i-1}$ and their associated points, every other point is replicated and propagated as virtual points to level $L_{i-2}$. This propagation process is repeated until the root level $L_{ie}$, (i.e., $L_1$) is reached. Note that the propagation process is employed to speed up the search; at each level, the filter-rule rectangles associated with each non-overlapping interval are as described in the preprocessing algorithm described previously. Virtual intervals and points that result from propagation are desirably ignored for association of filter-rule rectangles with non-overlapping intervals.

The propagation process increases memory space requirements by a constant factor, and so the total memory space requirement is still O(n). A maximum amount of virtual intervals created and corresponding maximum memory space is when $N_{lsMAX}$=n, n being the number of filter rules, in which case the number of boundary points at level $L_{sMAX}$ is 2n. The extra memory space due to the propagations is then as given in equation (1)

$$\left(n + \frac{n}{2} + \frac{n}{4} + ...\right) \leq 2n \qquad (1)$$

Increasing the memory space by a constant factor, however, allows for searching of multiple lists (i.e. lists of non-overlapping intervals at each level) efficiently. A packet EP=(S, D) arrives at the packet filter and is processed by the classification algorithm with a filter-rule table organized in accordance with the alternative embodiment. A first level, i.e., $L_1$ list of non-overlapping intervals $VD_1^j$ is searched as described previously with respect to the classification algorithm, taking O(log n) time for the worst case. This search results in locating the given point D in an interval $VD_1^j$ that may be a virtual interval propagated from the level $L_2$. With D localized to this interval $ID_1^j$, a search in the next level $L_2$ searches in the range of intervals given by $VD_1^j$. Because every other point has been propagated up from level $L_2$, only 2 intervals in $VD_2^j$ may fall within the interval $VD_1^j$ to which D has been localized. Hence, the search at level $L_2$ may be completed in O(1) time. In general, in moving from level $L_i$ to level $L_{i+1}$, the propagation of intervals allows enough information gained in the search at level $L_i$ to be employed in the search at level $L_{i+1}$ is O(1) time. Hence, the worst case execution time of the look-up algorithm of the alternative embodiment is $O(l_{sMAX}+\log n)$.

Figure 9A:
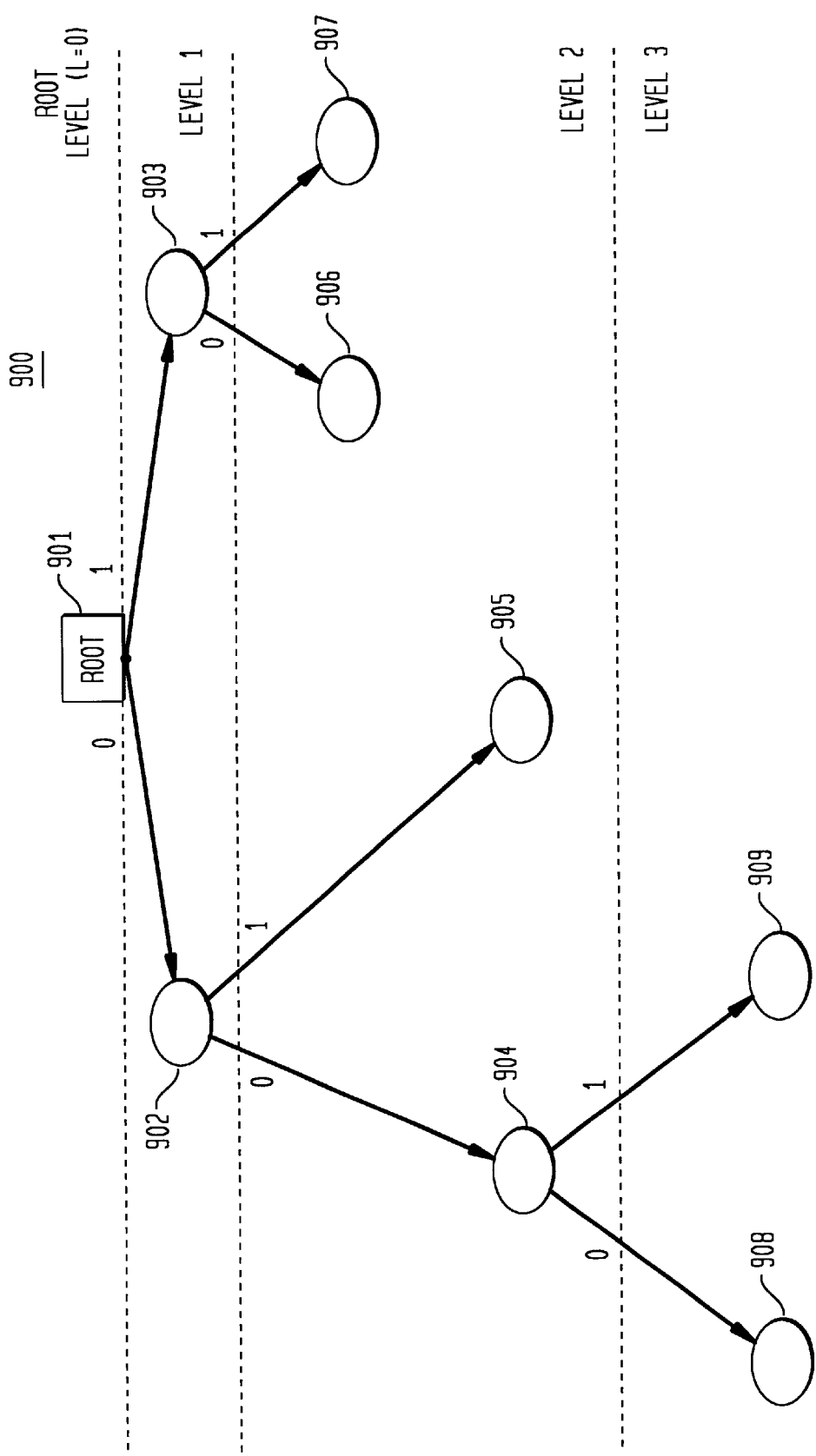
FIG. 9A illustrates an example of trie structure of an exemplary embodiment employing virtual intervals to reduce search time of a classification algorithm.

FIG. 9A and 9B illustrate an example of an alternative embodiment of the packet filter employing virtual intervals to reduce search time of the classification algorithm. FIG. 9A illustrates a trie structure employed to search prefix values of fourteen exemplary filter rules in ascending order of length. FIG. 9B shows creation of virtual intervals for levels of a portion of the trie structure shown in FIG. 9B. For the exemplary embodiment of FIG. 9A and FIG. 9B, Table 1 provides a list of filter-rules with corresponding prefix values and lengths for source fields and destination field ranges.

TABLE 1

| Filter-Rule Number | Source Prefix Value | Prefix length | Destination range d (lower bound, upper bound) |
|---|---|---|---|
| 1 | 11* | 2 | (0,15) |
| 2 | 0* | 1 | (4,7) |
| 3 | 00* | 2 | (12,15) |
| 4 | 0* | 1 | (12,15) |
| 5 | 0* | 1 | (8,15) |
| 6 | 10* | 2 | (8,15) |
| 7 | 001* | 3 | (8,15) |
| 8 | 000* | 3 | (6,7) |
| 9 | 000* | 3 | (4,5) |
| 10 | 001* | 3 | (8,9) |
| 11 | 001* | 3 | (4,5) |
| 12 | 001* | 3 | (10,11) |
| 13 | 001* | 3 | (12,13) |
| 14 | 001* | 3 | (0,3) |

A packet EP with fields S=0010 and D=1101 arrives in the system. Referring to FIG. 9A, a search of the trie structure 900 (the trie search) in the s-dimension begins at the root level 901 (level 0) to determine if the source address (S=0xxx) begins with a 0(state 902) or a 1 (state 903). This is a search of the set of prefixes of length 1. The trie search moves to the state 902 at level 1 corresponding to the prefix 0xxx of length 1. Similarly, at level 2 the trie search determines if the next bit of the source address (S=00xx) is a 0 (state 904) or a 1 (state 905). The trie search moves to the state 904 at level 2 corresponding to the prefix 00xx of length 2. Finally, at level 3 the trie search of a portion of the set of prefixes of length 3 determines if the next bit of the source address (S=001x) is a 0 (state 908) or a 1 (state 909). The trie search moves to the state 909 at level 3 corresponding to the prefix 001x of length 3. For searches of prefixes, only a portion of sets of prefixes are searched in the tries. Consequently, states 903, 906 and 907 are not reached since the trie search moves from state 901 to state 902, to state 904.

FIG. 9B illustrates an example of virtual intervals and point propagation to reduce search time of the classification algorithm. First, non-overlapping intervals in the d-dimension are shown for selected states at each level. For example, at level 1, state 902 corresponds to the prefix of length 1 being 0xxx. The filter-rules of this prefix 0xxx (from Table 1) are rules 2, 4 and 5 with respective filter-rule segments (decimal ranges in the d-dimension) of (4,7), (8,12) and (8,15). These filter-rule segments are then decomposed into non-overlapping intervals (4,7), (8,12) and (12, 15). Without virtual intervals, the trie search at level 1 searches these three intervals to find the value D=1101 (i.e., 13 decimal) included in the third non-overlapping interval (12,15) associated with rule 5. However, for the next level 2, the information of this search is lost.

Referring to FIG. 9B, the non-overlapping intervals of the highest level, level 3, are shown for the states 908 and 909. Points of these original, non-overlapping intervals at level 3 are propagated to the non-overlapping intervals at level 2. Brackets in FIG. 9B indicate original, non-overlapping intervals. For the example shown, alternate points of the intervals of the left state 908 (next bit 0) and right state 909 (next bit 1) are inserted into the non-overlapping intervals of the states of the next level 2, but as described previously the present invention is not so limited. For example, virtual intervals (0,3), (3,4), (5,6), (6,9), (9,11), (11,12), (12,13) and (13,15) are created from the original non-overlapping interval (12,15). Next, the alternate points of the intervals of state 904 are propagated to level 1, and as shown, propagated points, such as 12, may be duplicated in a level, since pointers are to be associated with the intervals. Normally, points of left and right states are propagated, but for the example of FIG. 9A and FIG. 9B, no rules or intervals are associated with state 905.

As the trie search of prefixes as shown in FIG. 9A progresses, the search of intervals is as shown in FIG. 9B. At level 1, state 902, the intervals in the d-dimension are searched and the value of D=1101, 13 decimal, is determined to be included in the interval (12, 12,15). At level 2, after the prefix search moves to state 904, the pointer associated with propagated point 12 in interval (12,12,15) is employed to limit the search in level 2 to interval (12,13,15). At level 3, after the prefix search moves to state 909, the pointer associated with propagated point 13 in interval (12,13,15) is employed to limit the search in level 3 to interval (12,13), associated with rule 13 of Table 1.

Figure 10:
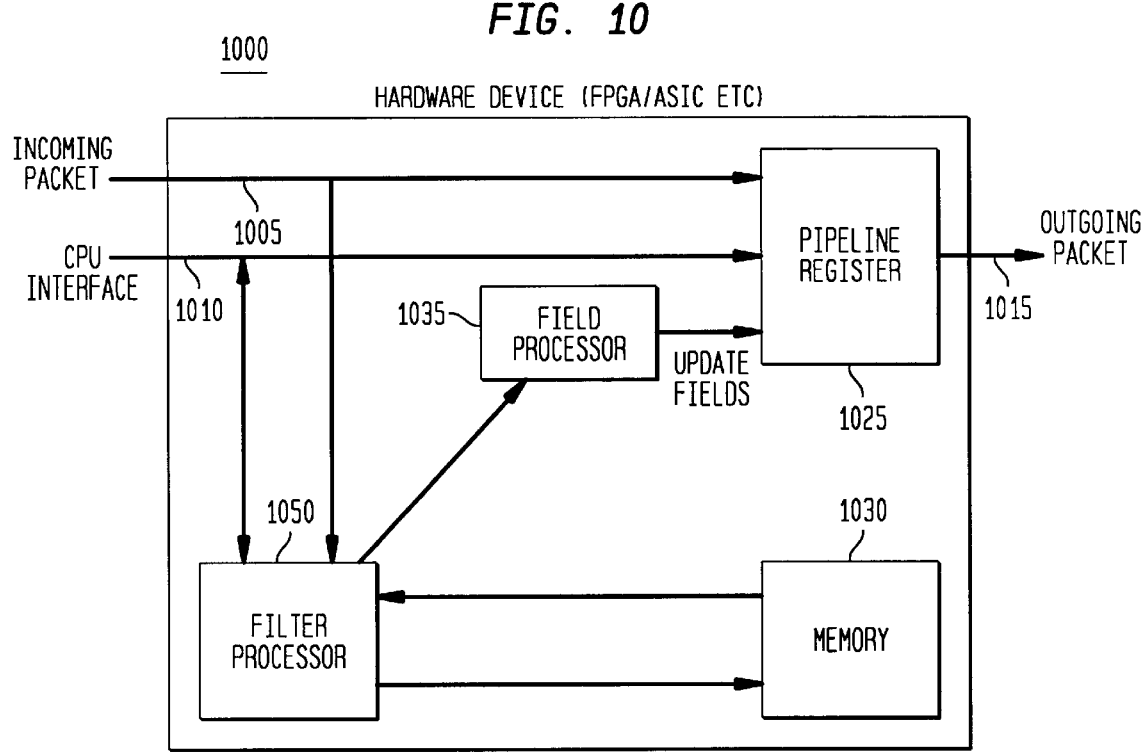
FIG. 10 illustrates a hardware system for implementation of the packet filter in accordance with the present invention in a packet forwarding engine or router.

As described, the algorithm for computing the filters is largely implemented in hardware and may be manufactured in application specific integrated circuit (ASIC) form, or as a field programmable gate array (FPGA) that consequently, may operate at very high speed. FIG. 10 illustrates the hardware system 1000 for implementation of the packet filter in accordance with the present invention in a packet forwarding engine or router, including an input line 1005 for receiving an incoming packet and a bi-directional CPU interface line 1010 representing control and timing lines for purposes of illustration. The incoming packet is input to a pipeline register 1025 for temporary storage and is also input to each classification processor 1050. Classification processor 1050 employs memory 1030 to identify a filter-rule to be applied to the incoming packet. Field processor 1035 updates fields of the packet stored in pipeline register 1025 based on the identified filter-rule to be applied to the incoming packet. The details of classification processor 1050 are now described with reference to FIG. 11.

Figure 11:
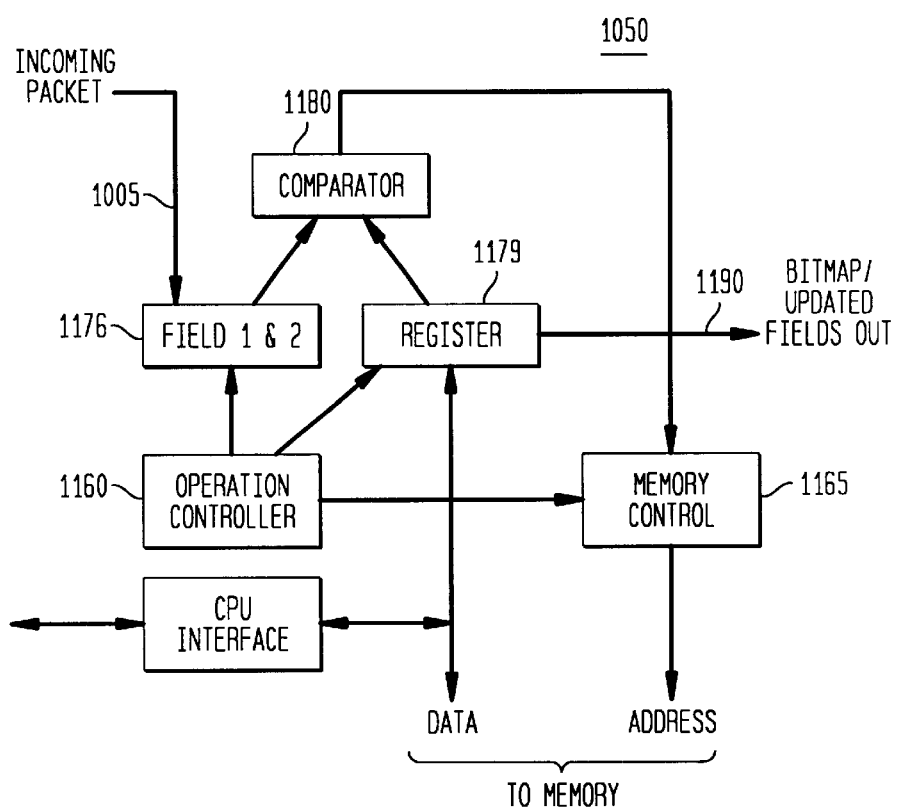
FIG. 11 shows a filter processor receiving incoming packets, storing field parameters and classifying a packet in accordance with the present invention.

FIG. 11 shows a classification processor 1050 that receives the incoming packet and stores field parameters, e.g., source address and destination addresses S and D, in a register 1176. Under the control of filter processor 1160, optional memory control device 1165, and associated memory 1030, the search of the classification algorithm is performed whereby non-overlapping interval information from memory 1030 is provided to the register 1179 for each prefix length. Comparator 1180 performs a comparison to ascertain each interval associated with the D value of the received packet. After the correct solution for a filter-rule rectangle is found, its corresponding bitmap vector containing potential filter-rule actions is provided from register 1179 along line 1190. From the resultant bitmap vector, the CPU will apply the rule of highest priority, and performs the action dictated by the filter rule upon the received packet stored in the pipeline register 1025. Thus, the packet may be dropped or forwarded to another destination on output line 1015.

The preprocessing algorithm of the present invention may be implemented in the classification processor by filter-rule processing and table processing modules. The filter-rule processing module may assign filter-rules to prefix values and lengths in one dimension, project the filter-rule segments in the other dimension, and decompose the filter-rule segments into non-overlapping intervals. The table-processing module may be employed to coordinate memory organization and storage, generating the necessary pointers with non-overlapping intervals for particular prefix value addressing schemes.

Figure 12:
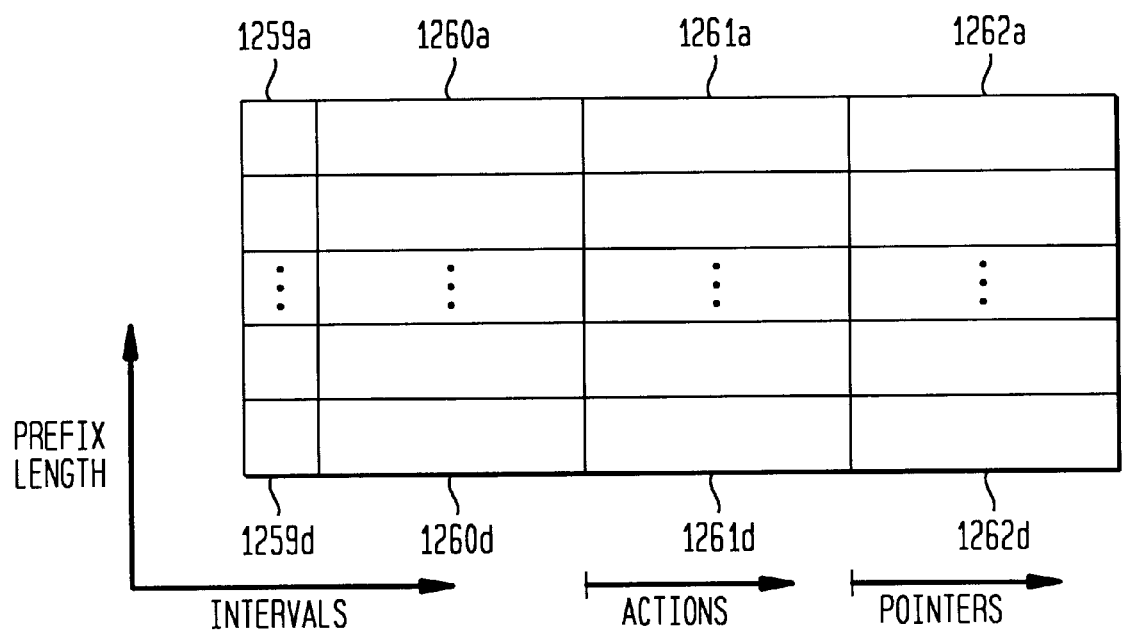
FIG. 12 shows an example memory organization of a filter-rule table for the system illustrated in FIG. 10, which depicts a filter-rule.

An example memory organization for the system is illustrated in FIG. 12, which depicts a filter-rule table having a plurality of interval lists in one dimension corresponding to each prefix length of another dimension, which may be associated with the following respective filter parameters: 1) destination addresses, and 2) source address. Entries of the filter-rule table are generated as described previously, i.e., with respect to FIGS. 6 and 7, and addressed by prefix values 1259a–1259d. Each filter-rule table is shown to include an array 1260a–1260d of intervals to be searched corresponding to prefix values as described above with reference to FIG. 8, and the corresponding filter actions 1261a–1261d and the pointers 1262a–1262 d.

While embodiments of the present invention are shown and described with respect to searches in a given dimension ordered from shortest to longest length, as would be apparent to one skilled in the art the present search algorithms and/or filter-rule table structures may be varied. For example, the search may be from the longest to the shortest prefix length, or from initial to final prefix values in an ordered list of the set of prefix values. Further, matching of packets field values with prefix values and interval values are described herein using binary search techniques, but the present invention is not so limited. As would be apparent to one skilled in the art, other search techniques to match values may be employed, such as employing a perfect hash method.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Apparatus for associating at least one filter rule with a packet, each filter rule and the packet characterized by values in first and second dimensions, the filter rule to be applied to the packet by a router in a communications network, the apparatus comprising:

a storage medium adapted to store a filter-rule table, each entry of the filter-rule table corresponding to a prefix value having a length in the first dimension and at least one interval in the second dimension; and a classification processor comprising:

a comparator adapted to identify each prefix value matching the value of the packet in the first dimension, and a filter processor adapted to retrieve, from the filter-rule table, each interval associated with each prefix value identified by the comparator containing the value of the packet in the second dimension, wherein the filter processor identifies as a solution interval the interval associated with the prefix length characterized by an associated predetermined metric and containing the second field, and wherein the classification processor associates the filter rule corresponding to the solution interval with the packet.

2. The invention as recited in claim 1, wherein the classification processor further comprises a pre-processor including:

a filter-rule processing module adapted to:

assign each filter-rule to one or more prefix values based on the values in the first dimension, project, for each prefix value having the same length, values of each corresponding filter rule of the prefix value onto the second dimension to define at least one filter-rule segment, and decompose each filter-rule segment into one or more non-overlapping intervals associated with each prefix value of the same length in the second dimension; and a table-processing module adapted to generate a pointer for each corresponding non-overlapping interval to identify an included filter-rule, the table-processing module adapted to store the pointer as an entry of the filter-rule table associated with a prefix value length and a non-overlapping interval.

3. The invention as recited in claim 2, wherein:

the filter-rule processing module further comprises:

assigning means for assigning each prefix value of the same length to a corresponding level;

first projecting means for projecting, for the level having prefix values of a first length, values of each corresponding filter rule onto the second dimension to define at least one filter-rule segment;

second projecting means for projecting, in each level beginning at the level having prefix values having a second length, 1) values of each corresponding filter rule onto the second dimension to define at least one filter-rule segment in a current level, and 2) selected points of the at least one non-overlapping interval in the previous level so as to define at least one virtual interval in the second dimension; and interval forming means for forming each filter-rule segment and each virtual interval of the current level into one or more non-overlapping intervals associated with each prefix value having the same length.

4. The invention as recited in claim 3, wherein the first and second lengths are either 1) the longest and next longest lengths in a descending prefix length order, respectively, or 2) the shortest and next shortest lengths in an ascending prefix length order, respectively.

5. The invention as recited in claim 3, wherein the second projecting means projects, as selected points, every Nth point that defines either a start point or a stop point of each non-overlapping interval in the previous level, N an integer greater than 1.

6. The invention as recited in claim 2, wherein the values of each filter rule in the second dimension are at least one range being a power of 2, each range being projected as a corresponding filter-rule segment to form the non-overlapping interval in the second dimension.

7. The invention as recited in claim 1, wherein the values of each filter rule are field ranges, the field ranges in the first dimension being a power of two, and each prefix length defines a number of specified bits of the field range.

8. The invention as recited in claim 1, wherein an entry of the filter-rule table of the storage medium includes a pointer identifying at least one filter rule contained in the corresponding non-overlapping overlapping interval.

9. The invention as recited in claim 8, wherein each filter-rule has an associated priority, and the pointer identifies the filter-rule with the highest associated priority contained in the corresponding non-overlapping interval.

10. The invention as recited in claim 8, wherein the values of each filter rule are field ranges, the field ranges in the first dimension being a power of two, and each prefix length defines a number of specified bits of the field range.

11. The method as recited in claim 1, wherein the associated predetermined metric is either the prefix value having the longest prefix length, the shortest prefix length or the prefix length having a highest priority.

12. A method of associating at least one filter rule with a packet, each filter rule and the packet characterized by values in first and second dimensions, the filter rule to be applied to the packet by a router in a communications network, the method comprising the steps of:

a) providing a filter-rule table, each entry of the filter-rule table corresponding to a prefix value having a length in the first dimension and at least one interval in the second dimension;

b) identifying each prefix value matching the value of the packet in the first dimension;

c) retrieving, from the filter-rule table, each interval associated with each prefix value identified in step b) containing the value of the packet in the second dimension;

d) identifying, as a solution interval, the interval associated with the prefix value characterized by an associated predetermined metric and containing the value of the packet in the second dimension; and e) associating the filter rule corresponding to the solution interval with the packet.

13. The method as recited in claim 12, wherein the step a) comprises the steps of:

f) assigning each filter-rule to one or more prefix values based on the values in the first dimension;

g) projecting, for each prefix value having the same length, values of each corresponding filter rule of the prefix value onto the second dimension to define at least one filter-rule segment;

h) decomposing each filter-rule segment into one or more non-overlapping intervals associated with each prefix value of the same length in the second dimension;

i) generating a pointer for each corresponding non-overlapping interval to identify an included filter-rule; and j) storing the pointer as an entry of the filter-rule table associated with a prefix value length and a non-overlapping interval.

14. The method as recited in claim 13, wherein:

step g) further comprises the steps of:

g1) assigning each prefix value of the same length to a corresponding level;

g2) projecting, for the level having prefix values having a first length, values of each corresponding filter rule onto the second dimension to define at least one filter-rule segment, g3) projecting, in each level beginning at the level having prefix values having a second length, 1) values of each corresponding filter rule onto the second dimension to define at least one filter-rule segment in a current level, and 2) selected points of the at least one non-overlapping interval in the previous level so as to define at least one virtual interval in the second dimension; and step h) further comprises the step of:

h1) forming each filter-rule segment and each virtual interval of the current level into one or more non-overlapping intervals associated with each prefix value having the same length.

15. The method as recited in claim 14, wherein, for steps g2) and g3), the first and second lengths are either 1) the longest and next longest lengths in a descending prefix length order, respectively, or 2) the shortest and next shortest lengths in an ascending prefix length order, respectively.

16. The method as recited in claim 14, wherein step g3) projects, as selected points, every Nth point that defines either a start point or a stop point of each corresponding non-overlapping interval in the previous level, N an integer greater than 1.

17. The method as recited in claim 13, wherein the values of each filter rule in the second dimension are at least one range being a power of 2, the projecting step g) projects each range as a corresponding filter-rule segment in the second dimension, and the decomposing step h) forms the non-overlapping interval from the corresponding filter-rule segment projected in step g).

18. The method as recited in claim 12, wherein the values of each filter rule are field ranges, the field ranges in the first dimension being a power of two, and each prefix length defines a number of specified bits of the field range.

19. The method as recited in claim 12, wherein, for the filter-rule table provided in step a), an entry of the filter-rule table associated with a prefix value length and a non-overlapping interval includes a pointer identifying at least one filter rule contained in the corresponding non-overlapping interval.

20. The method as recited in claim 19, wherein each filter-rule has an associated priority, and the pointer generated in step i) identifies the filter-rule with the highest associated priority contained in the corresponding non-overlapping interval.

21. The method as recited in claim 19, wherein the values of each filter rule are field ranges, the field ranges in the first dimension being a power of two, and each prefix length defines a number of specified bits of the field range.

22. The method as recited in claim 12, wherein for step d) the associated predetermined metric is either the prefix value having the longest prefix length, the shortest prefix length or the prefix length having a highest priority.

23. A method of storing at least one filter rule with values associated with first and second dimensions in a filter-rule table comprising the steps of:

a) assigning each filter-rule to one or more prefix lengths based on the values in the first dimension;

b) projecting, for each prefix length, values of each corresponding filter rule of the prefix length onto the second dimension to define at least one filter-rule segment, c) decomposing each filter-rule segment into one or more non-overlapping intervals associated with each prefix length and corresponding filter rule in the second dimension;

d) generating a pointer for each corresponding non-overlapping interval to identify an included filter-rule; and e) storing the pointer as an entry of the filter-rule table associated with a prefix length and a non-overlapping interval.

24. The method as recited in claim 23, wherein:

step b) further comprises the steps of:

b1) assigning each prefix value of the same length to a corresponding level;

b2) projecting, for the level having prefix values of a first length, values of each corresponding filter rule onto the second dimension to define at least one filter-rule segment, b3) projecting, in each level beginning at the level having prefix values having a second length, i) values of each corresponding filter rule onto the second dimension to define at least one filter-rule segment in a current level, and ii) selected points of the at least one non-overlapping interval in the previous level so as to define at least one virtual interval in the second dimension; and step c) further comprises the step of:

c1) forming each filter-rule segment and each virtual interval of the current level into one or more non-overlapping intervals associated with each prefix value having the same length.

25. The method as recited in claim 24, wherein, for steps b2) and b3), the first and second lengths are either 1) the longest and next longest lengths in a descending prefix length order, respectively, or 2) the shortest and next shortest lengths in an ascending prefix length order, respectively.

26. The method as recited in claim 24, wherein step b3) projects, as selected points, every Nth point that defines either a start point or a stop point of each corresponding non-overlapping interval in the previous level.

27. The method as recited in claim 23, wherein the values of each filter rule are field ranges, the field ranges in the first dimension being a power of two, and each prefix length defines a number of specified bits of the field range.

28. The method as recited in claim 23, wherein each pointer stored in the filter-rule table in step e) identifies each filter rule contained in the non-overlapping interval.

29. The method as recited in claim 23, wherein each pointer stored in the filter-rule table in step e) identifies the filter-rule with the highest associated priority contained in the corresponding non-overlapping interval.

30. The method as recited in claim 23, wherein the values of each filter rule in the second dimension are at least one range being a power of 2, the projecting step b) projects each range as a corresponding filter-rule segment in the second dimension, and the decomposing step c) forms the non-overlapping interval from the corresponding filter-rule segment projected in step b).

* * * * *